United States Patent
Taylor (10) Patent No.: US 8,239,781 B2
(45) Date of Patent: Aug. 7, 2012

(54) DRAG AND DROP OF AN APPLICATION COMPONENT TO DESKTOP

(75) Inventor: Steven Taylor, Leimen (DE)

(73) Assignee: SAP AG, Walldorf (DE)

( * ) Notice: Subject to any disclaimer, the term of this patent is extended or adjusted under 35 U.S.C. 154(b) by 509 days.

(21) Appl. No.: 12/495,505

(22) Filed: Jun. 30, 2009

(65) Prior Publication Data

US 2010/0333008 A1 Dec. 30, 2010

(51) Int. Cl.
*G06F 3/048* (2006.01)
(52) U.S. Cl. .................................... 715/769; 705/7.11
(58) Field of Classification Search ................. 715/769; 705/7.11
See application file for complete search history.

(56) References Cited

U.S. PATENT DOCUMENTS

| | | | |
|---|---|---|---|
| 2004/0212640 A1* | 10/2004 | Mann et al. | 345/792 |
| 2006/0010394 A1* | 1/2006 | Chaudhri et al. | 715/779 |
| 2006/0277469 A1* | 12/2006 | Chaudhri et al. | 715/709 |
| 2007/0038934 A1* | 2/2007 | Fellman | 715/700 |
| 2007/0043839 A1* | 2/2007 | Amadio et al. | 709/222 |
| 2007/0074126 A1* | 3/2007 | Fisher et al. | 715/764 |
| 2007/0174410 A1* | 7/2007 | Croft et al. | 709/208 |
| 2008/0034314 A1* | 2/2008 | Louch et al. | 715/778 |
| 2008/0040426 A1* | 2/2008 | Synstelien et al. | 709/203 |
| 2008/0040681 A1* | 2/2008 | Synstelien et al. | 715/765 |
| 2008/0066078 A1* | 3/2008 | Rathod et al. | 719/311 |
| 2008/0077874 A1* | 3/2008 | Garbow et al. | 715/764 |
| 2008/0141153 A1* | 6/2008 | Samson et al. | 715/769 |
| 2008/0271127 A1* | 10/2008 | Naibo et al. | 726/6 |
| 2008/0307385 A1* | 12/2008 | Dreiling et al. | 717/108 |
| 2009/0063178 A1* | 3/2009 | Pousti et al. | 705/1 |
| 2009/0089752 A1* | 4/2009 | Tristram | 717/120 |
| 2009/0100377 A1* | 4/2009 | Miyamoto et al. | 715/810 |
| 2009/0210811 A1* | 8/2009 | Saul et al. | 715/769 |
| 2009/0254931 A1* | 10/2009 | Pizzurro et al. | 725/5 |
| 2010/0050111 A1* | 2/2010 | Duffy | 715/781 |
| 2010/0250399 A1* | 9/2010 | Williams et al. | 705/27 |

\* cited by examiner

*Primary Examiner* — Tuyetlien Tran
(74) *Attorney, Agent, or Firm* — Fish & Richardson P.C.

(57) ABSTRACT

The present disclosure involves systems, software, and computer implemented methods for dragging and dropping a component of an application onto a virtual desktop. One process includes operations for receiving a request to copy a selected component of an application from a plurality of components of the application onto the virtual desktop. A display window for displaying the selected component of the application is executed and the unselected components of the application are filtered by visually concealing the unselected components. The process can further include presenting the selected component of the application in the display window.

22 Claims, 6 Drawing Sheets

DRAG AND DROP OF AN APPLICATION COMPONENT TO DESKTOP

TECHNICAL FIELD

The present disclosure relates to software, computer systems, and computer implemented methods for drag-and-drop of selected components of an application from an application window onto a graphical desktop, or other similar user interface.

BACKGROUND

Computer applications may have multiple components or frames, each presented in a window to a user of the application. Multiple components of an application are often displayed simultaneously in a single window open to the user. Frequently, users wish to access only particular components of the application while simultaneously using other applications. For example, a user may need to view only one component of an application consisting of many components. The one component of the application may need to be periodically updated and presented to the user, while other applications may also require the user's attention at the same time.

Computer operating systems and applications generally have capabilities that allow data objects to be moved or copied from one location to another, often via keystrokes or selected cut-and-paste processes. In some instances, drag-and-drop functions are available to a user to facilitate the moving of data objects stored in a computer. For example, a standard drag-and-drop function may be executed when a user selects a data object with any kind of user-interface device and copies the data object from one end of the graphical user interface (GUI) to another end of the GUI by "dragging" or moving an icon of the data object on the computer screen from the first end to the second end. The appearance of "dragging" and "dropping" the data object across the computer screen provides the user with a visual handle on the process of copying the data object from the first location to the second location.

SUMMARY

The present disclosure provides systems, software, and computer implemented techniques for dragging and dropping a component of an application onto a virtual desktop such that the functionality of that component is directly—and efficiently—available for subsequent use. For example, a computer program product is encoded on a tangible storage medium, where the product comprises computer readable instructions for causing one or more processors to perform operations. These operations can include receiving a request to copy a selected component of an application from a plurality of components of the application onto a virtual desktop. A display window for displaying the selected component of the application is executed and the unselected components of the application are filtered by visually concealing the unselected components. The computer program product can further launch, implement, store, or otherwise execute operations such as presenting the selected component of the application in the display window.

Various implementations can include the following features. For example, the techniques can also include creating a configuration file comprising filter parameters defining the filtering of the unselected components of the application. The configuration file can include an identification of the location of the selected component of the application, and the user's selection of the configuration file can initiate presentation of the selected component of the application in a second display window. Further, the plurality of components of the application may be configured in a framed data structure operable to be filtered based on the user's selection. After the selected component of the application is presented to the user and the unselected components are filtered, the selected component can still be updated by the application.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally describes computer systems, software, and computer implemented methods for copying a particular component of an application via drag-and-drop functionality from an application to a virtual desktop of the computer's graphical interface. For example, the component may be presented via a main window frame of the application and configured or otherwise adapted to be dragged from the main window to the more generic operating system interface. In certain implementations, copying a particular component of an application to a desktop includes filtering the remaining, unselected components of the application in order to present the particular component of the application to a user. The filtering of unselected components of the application in some implementations can also be coupled with enhanced drag-and-drop capabilities associated with the application and operating system to implement a user-friendly process of copying selected components of an application to the computer's desktop. For example, a general runtime authoring scheme can be enhanced such that a drop mechanism is provided onto the desktop where an external configuration file may be created on the fly and executed. Once a user selects a particular component to be copied to the desktop and "drops" the component onto the desktop, the configuration file is executed, and the unselected components of the application are filtered while the selected component is included in a filtered view that is passed to the application for presentation to the user. In certain implementations, the application is stored and executed on a remote server with respect to the user of the computer with the virtual desktop. Further, a selected component of an application can be copied onto a separate application rather than onto the desktop.

One potential benefit of such techniques is that a user may selectively dissect an application and maintain only the components of the application that the user desires. The user may also customize the arrangement of one or more components and enable only the customized components of the application, thereby allowing for a more efficient or customized presentation of the components via the desktop than that provided by the application itself. Further, enhanced drag-and-drop capabilities allow the user to move the desired component from an application window to the desktop for ease of use. Thus, the main application window may be disabled or hidden while still allowing the user to interact with a selected component of the application on the desktop. The selected component can be continuously or periodically updated as needed without a full application window cluttered with unused application components. This may be beneficial when, for example, an application provides a window with multiple components, some of which may be unnecessary for the user, and the user plans to execute other applications but still desires to maintain at least one component of the previous application. In certain implementations, the selected component can be dragged onto the desktop and used in isolation from the remaining components of the application similar to a stand-alone application.

Figure 1:
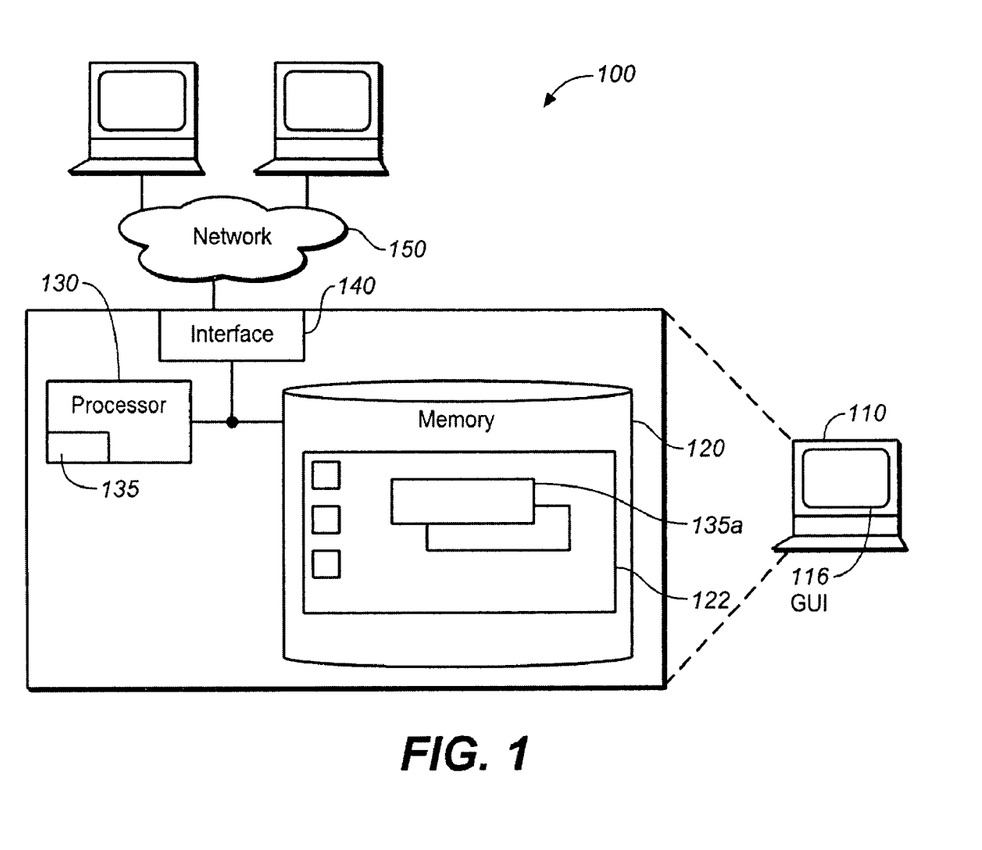
FIG. 1 illustrates an example environment implementing various features of the drag-and-drop operations within the context of the present disclosure.

Turning to the illustrated example, FIG. 1 illustrates an example system 100 for dragging and dropping a component of an application 135a onto a desktop 122. The system 100 may include any computer or processing device 110 such as, for example, a server, general-purpose personal computer (PC), Macintosh, workstation, Unix-based computer, touch screen terminal, network computer, kiosk, wireless data port, smart phone, personal data assistant (PDA), one or more processors within these or other devices, or any other suitable processing device. In other words, the present disclosure contemplates computers other than general purpose computers, as well as computers without conventional operating systems. Computer 110 may be adapted to execute any operating system including Windows, Linux, UNIX, Windows Server, or any other suitable operating system. According to one embodiment, computer 110 may also include or be communicably coupled with a web server and/or a mail server.

Illustrated computer 110 includes example processor 130. Although FIG. 1 illustrates a single processor 130 in computer 110, two or more processors may be used according to particular needs, desires, or particular embodiments of system 100. Each processor 130 may be a central processing unit (CPU), a blade, an application specific integrated circuit (ASIC), or a field-programmable gate array (FPGA). The processor 130 may execute instructions and manipulate data to perform the operations of system 100, often using software. For example, processor 130 may execute some or all of an application 135, which is often a multi-faceted business application. In some instances, an application 135 may execute or provide a number of application services, including customer relationship management (CRM) systems, human resources management (HRM) systems, financial management (FM) systems, project management (PM) systems, knowledge management (KM) systems, and electronic file and mail systems. The application 135 may also be operable to exchange data with a plurality of enterprise-based systems and, in the process, update or modify one or more content repositories. The various services performed may allow the application to orchestrate one or more business processes in synchronization with other processes that directly or indirectly affect the information stored within one or more of the content repositories. For instance, the application 135 may drive business processes across different applications, systems, technologies, and organizations, thus driving end-to-end business processes across heterogeneous systems or sub-systems. The application 135 can be, for example, a pricing update, inventory interface, sales order processor, or any other business application. Regardless of the particular implementation, "software" may include any computer-readable instructions embodied on tangible medium (such as memory 120) including executable code, firmware, wired or programmed hardware, or any combination thereof as appropriate such that it is stored on tangible medium and operable to be executed. Indeed, each software component may be fully or partially written or described in any appropriate computer language including C, C++, Java, Visual Basic, assembler, Perl, any suitable version of 4GL, as well as others. It will be understood that while the software illustrated in FIG. 1 is shown as individual modules that implement the various features and functionality through various objects, methods, or other processes, the software may instead include a number of sub-modules, third-party services, components, libraries, and such, as appropriate. Conversely, the features and functionality of various components can be combined as sub-components within a single logical component as appropriate.

The computer also typically includes a user interface, such as a graphical user interface (GUI) 116. The GUI 116 comprises a graphical user interface operable to, for example, allow the user of the client to interface with at least a portion of the platform for any suitable purpose, such as creating, preparing, requesting, or analyzing data, as well as viewing and accessing source documents associated with business transactions. Generally, the GUI 116 provides the particular user with an efficient and user-friendly presentation of business data provided by or communicated within the system. The GUI 116 may comprise a plurality of customizable frames or views having interactive fields, pull-down lists, and buttons operated by the user. The GUI 116 is often configurable, supports a combination of tables and graphs (bar, line, pie, status dials, etc.), and is able to build real-time portals, where tabs are delineated by key characteristics (e.g. site or micro-site). Therefore, the GUI 116 contemplates any suitable graphical user interface, such as a combination of a generic web browser (e.g., Microsoft Internet Explorer or Mozilla Firefox), intelligent engine, application front-end, and user desktop (or user interface) that processes information in the platform and efficiently presents the results to the user visually. In certain situations, the GUI 116 provides data to a server from the client via the web browser and processes the appropriate HTML or XML responses to the underlying engine using a network.

The example client may be communicably coupled with a network 150 that facilitates wireless or wireline communication between the computer 110 and any other local or remote computer, such as clients. The network 150 may be all or a portion of an enterprise or secured network. In another example, the network 150 may be a virtual private network (VPN) merely between the server and the client across wireline or wireless link. Such an example wireless link may be via 802.11a, 802.11b, 802.11g, 802.11n, 802.20, WiMax, and many others. The network 150 may include one or more local area networks (LANs), radio access networks (RANs), metropolitan area networks (MANs), wide area networks (WANs), all or a portion of the global computer network known as the Internet, and/or any other communication platform or systems at one or more locations. The network 150, however, is not a required component of the present disclosure.

Computer 110 may also include interface 140 for communicating with other computer systems over network 150 in a client-server or other distributed environment. In certain embodiments, computer 110 receives requests for data access from local or remote senders through interface 140 for storage in memory 120 and/or processing by processor 130. Generally, interface 140 comprises logic encoded in software and/or hardware in a suitable combination and operable to communicate with network 150. More specifically, interface 140 may comprise software supporting one or more communications protocols associated with communications network 150 or hardware operable to communicate physical signals.

In general, the computer 110 is a computer with memory 120 for storing data and program instructions. Illustrated memory 120 represents any memory and may take the form of volatile or non-volatile memory including, without limitation, magnetic media, optical media, random access memory (RAM), read-only memory (ROM), removable media, or any other suitable local or remote memory components. Illustrated memory 120 includes storage of the desktop interface 122 of the computer 110 as well as various components of applications 135a that have been copied onto the desktop 122. But memory 120 may also include any other appropriate data such as HTML files, data classes or object interfaces, unillustrated software applications or sub-systems, and so on.

Application 135 can be any kind of software application, including a business application or software development application. In some implementations, both the source and destination of the drag-and-drop operation can be a business application. Thus, a component of an application can be dragged and dropped from a first business application into a second business application based on the content of the component and the source and destination environment of the component. The capability for copying a component of a business application to another business application may be based on the role of the component or any associated business processes or relations.

In certain implementations, application 135 can include a plurality of components 135a. In general, a component 135a of the application 135 can include a module or feature of the application 135 that is associated with a user-interface element and is depicted visually in the user interface by a window or frame 135a. The user-interface element may have built-in drag-and-drop capabilities or other types of capabilities for interaction with any kind of user-interface device such as a roller-ball, touchpad, trackpad, mouse, or other pointing device. For example, user-interface elements of the different frames or modules within the application 135 may be rearranged within a window using drag-and-drop operations performed using any kind of compatible user-interface device. A drag-and-drop operation can be performed when a user initiates an action such as, for example, a particular touch movement on a touchpad, a click and drag motion on a mouse, or through tracking of eye movement to be translated into selection of items.

Certain elements may be useful as a drag source or drop target. For example, ideal candidates for drag sources can include rows of a table or nodes of a tree. In these instances, particular rows or nodes may be selected and used as a drag source. Other user-interface elements, however, may not be ideal or desired candidates for drag sources and should not be interfered with by certain drag-and-drop operations. In some user-interface elements, features involving user-interface devices may limit the implementation of drag-and-drop features for that element. For example, applications may currently allow a user to initially select a check-box but then cancel the selection by dragging or moving a user-interface cursor outside of the check-box before unselecting the check-box. This feature is also included in other elements such as radio buttons, built-in buttons, and links, for example. In another example, text input controls use the drag-and-drop operations for text selection. Thus, because users may be accustomed to other common features found in certain user interface elements, the drag-and-drop operations discussed in the present disclosure may not be enabled for every visible element of an application. In some implementations, drag-and-drop functionality does not necessarily enable every user-interface element of an application as a potential "draggable" object. Instead, the developer, administrator, or user may enable or disable this feature for various components. In certain situations, the enabling or disabling of certain features may be based on user role, user security, data security, or business logic.

In a server-client environment in which application 135 is executed on a server, application 135 may have limited opportunities to communicate with the client. Thus, communications between server and client should be synchronized such that enough information is passed to the server in a single roundtrip to enable a drag-and-drop operation. Such information may include the specific objects that can be dragged (drag sources), the objects that can be dropped onto (drop targets), which drag sources are compatible with which drop targets, the operations that are allowed, what are the default operations, and the insert positions that are supported by each drop target.

In order to describe which drag sources are compatible with which drop targets, application 135 may also designate objects with an identifier or tag. For example, a drag source can declare a plurality of tags, with each tag corresponding to categories of data or to ways of representing data. Similarly, a drop target can declare the tags of drag sources it can accept. Specifically, tags can comprise a list of identifiers used to determine the compatibility of a given drag source with potential drop targets. If the list is empty, no drag can be started from that source. The tags may also be used to determine the compatibility of potential drag sources with a given drop target. If the list is empty, no drop is accepted by the drop target. Further, in addition to including the identifiers in a list, any prefix of an identifier followed by an asterisk representing all identifiers starting with the prefix can also be supported within a tag. Thus, a drag source can define a set of permissible tags which apply to the data being dragged, while a drop target can define a set of permissible tags which apply to destinations for dropping data. The semantics of each tag, however, can vary from application to application.

In some implementations, basic support for drag-and-drop operations is built into a core user-interface element library, where view elements are used to provide information about drag sources or drop targets in a uniform and extensible fashion. The basic support can ensure that drag sources and drop targets include properties that describe the text representation of the data to be transported, whether the drag source or drop target is enabled, the MIME type describing the format for the text representation of the data to be transported along the way to the drop target, the extent to which the drag source or drop target can participate in drag-and-drop operations across component boundaries, and the tags used to determine the compatibility of potential drag sources with potential drop targets.

In certain implementations, such as in some server-client architecture implementations, basic support for drag-and-drop operations includes defining the data to be transported along the way to a drop target by the drag source either statically or dynamically. For static drag sources, such as a single image, the text representation of the data is statically defined within the drag source's properties. For dynamic drag sources, such as a table, where multiple rows can be selected on the client side without a roundtrip communication with the server, the text representation of the data may need to be provided dynamically, or on-demand. In this instance, the text representation of the data can be provided on-demand by an asynchronous server roundtrip using a callback to the application when the drag operation starts.

Generic support for drag-and-drop operations can also be provided by using generic drag sources and generic drop targets. Certain user-interface elements already have functions associated with the dragging of the element such as selecting text in an input field or canceling an initial selection of a check-box. Accordingly, in some implementations, a generic drag source is not implemented in the form of a container holding arbitrary content. Instead, an image can be used as a drag source, which can serve as an iconic handle for an arbitrary object. To support generic drop targets, a data object can act as a generic drop target area when used as an invisible frame around an arbitrary user-interface element. The data object forms a drop area which is not visible itself but displays its content. A drop on the content is handled by the generic drop target area and initiates a drop event, which provides appropriate event parameters for an application to perform a drop operation. The resulting interface object is often any appropriate graphical indicator, including an icon, pointer, redirector, URL, and others.

Figure 2:
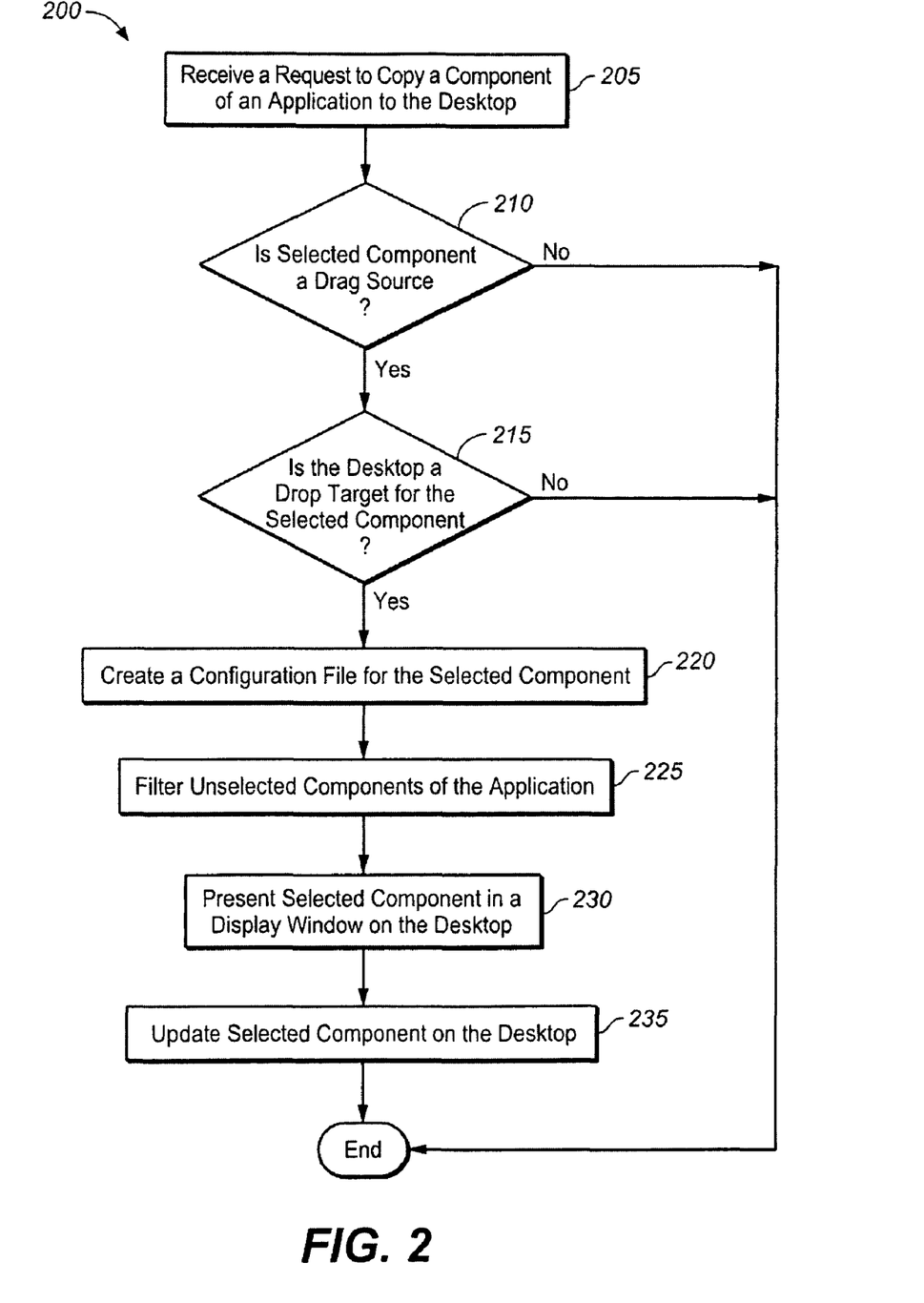
FIG. 2 is a flow chart of an example drag-and-drop method implemented using an appropriate system, such as the system described in FIG. 1.

FIG. 2 is a flow chart 200 depicting an example computer implemented drag-and-drop process of the present disclosure. First, a request to copy a component of an application 135a to a virtual desktop is received from a user at step 205. The request from the user may comprise a selection of a particular component of the application by a user-interface device and a drag-and-drop motion indicating the source and destination of the copied object. At step 210, the application 135 determines whether the component of the application 135a is a drop source enabled to be dragged by a user-interface device. Also, the application 135 determines whether the component of the application 135a can be dropped onto the desktop by identifying the tags associated with the component and the desktop at step 215.

If the component 135a is a drag source compatible with the desktop as a drop target, application 135 often creates a configuration file designating the filter parameters for the component of the application 135a and the source location of the component 135a at step 220. In some implementations, the configuration file is an XML document that includes an identification of the component 135a to be dragged onto the desktop or a Uniform Resource Locator (URL) indicating the location of the component 135a on a server. The configuration file can be created on-the-fly and is executed to pass a filtered view of the selected component 135a to the application's internal control.

The application 135 filters unselected components of the application at step 225 in order to present only the component that is to be copied to the desktop. In some implementations, the components of the application are originally created in a virtual container or frame, which can be an HTML file, a Graphics Interchange Format (GIF) file, an iFrame, or other type of file, in order to implement an environment in which various components can be easily selected, isolated, rearranged, or filtered. Based on the framed format of draggable components in the application, the selected component of the application 135a can be presented in a display window executed on the user's desktop at step 230 while the remaining, unselected components can be filtered by visually concealing the unselected components from the user's view. Accordingly, from the user's perspective, only the selected component of the application 135a is copied to the user's desktop, and the unneeded portions of the application are disabled and hidden from the user. Once the component 135a has been copied to the desktop, the user can interact with the copied component of the application 135a from the desktop while concurrently running other applications. Further, the application 135 can continue to update and present any data utilized by the component 135a at step 235.

FIGS. 3A-D depict screenshots of an example implementation of the drag-and-drop procedure described in the present disclosure. Application 135, visually displayed in an application window 135, comprises a plurality of components 135a-c, each component visually displayed within the application window 135 as individual frames 135a-c. A cursor 305 of a user-interface device can be used to select a portion of a component frame 135a to initiate a drag-and-drop sequence. The component frame 135a can be dragged from the application window 135 to the desktop 122, indicating that the particular component 135a is selected to be copied onto the desktop 122. To facilitate drag-and-drop operations, certain user-interface elements associated with drag sources can be marked as a handle for dragging. Examples of user-interface elements used as handles for dragging include images, captions such as those used as a header for groups or trays, and section headers. In some implementations, the cursor 305 can indicate a component's pliancy, or ability to be dragged, by changing into a move cursor when the cursor 305 hovers over the handle associated with the component.

Figure 3A:
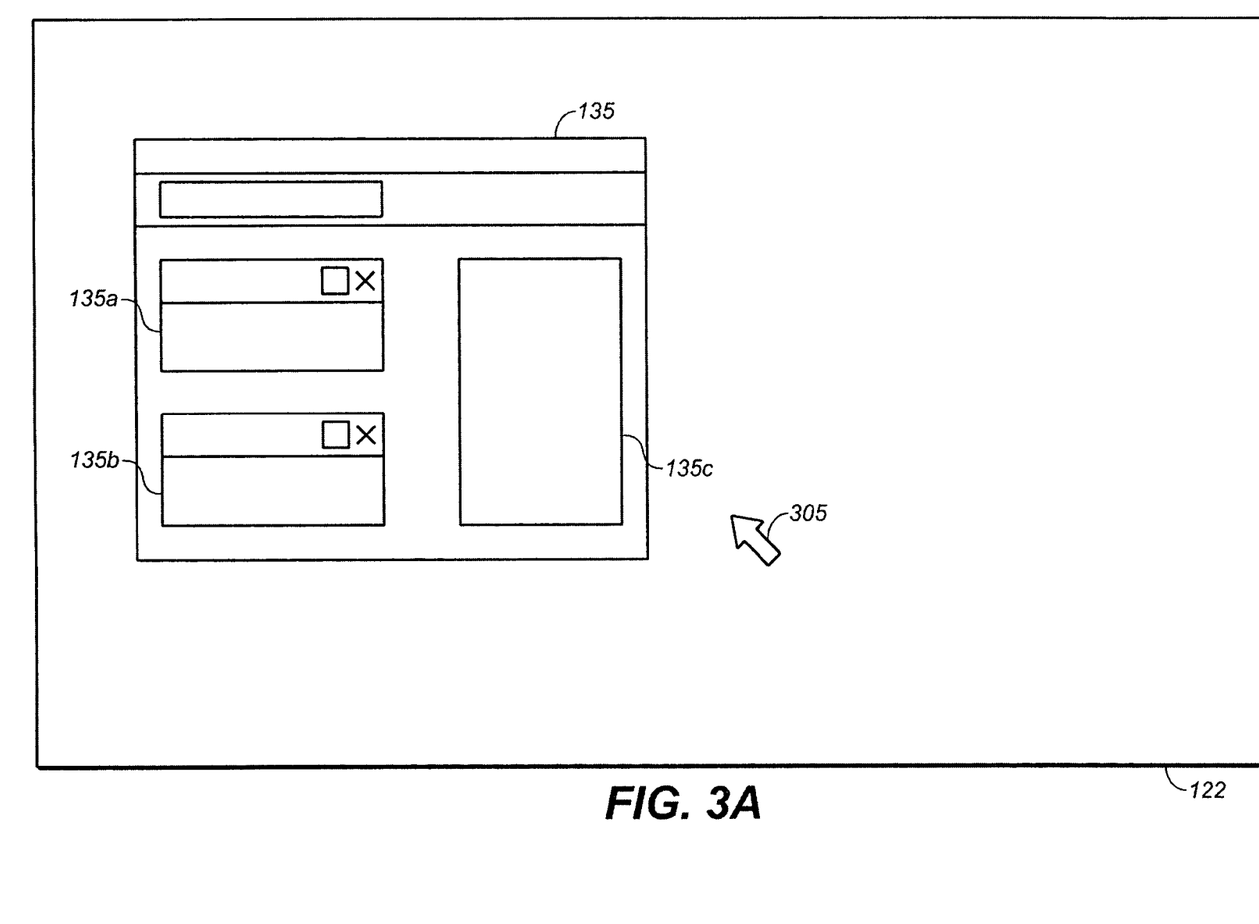
FIGS. 3A-D are example screenshots of an example drag-and-drop process performed on a selected component of an application by an appropriate system, such as the system described in FIG. 1.
Figure 3B:
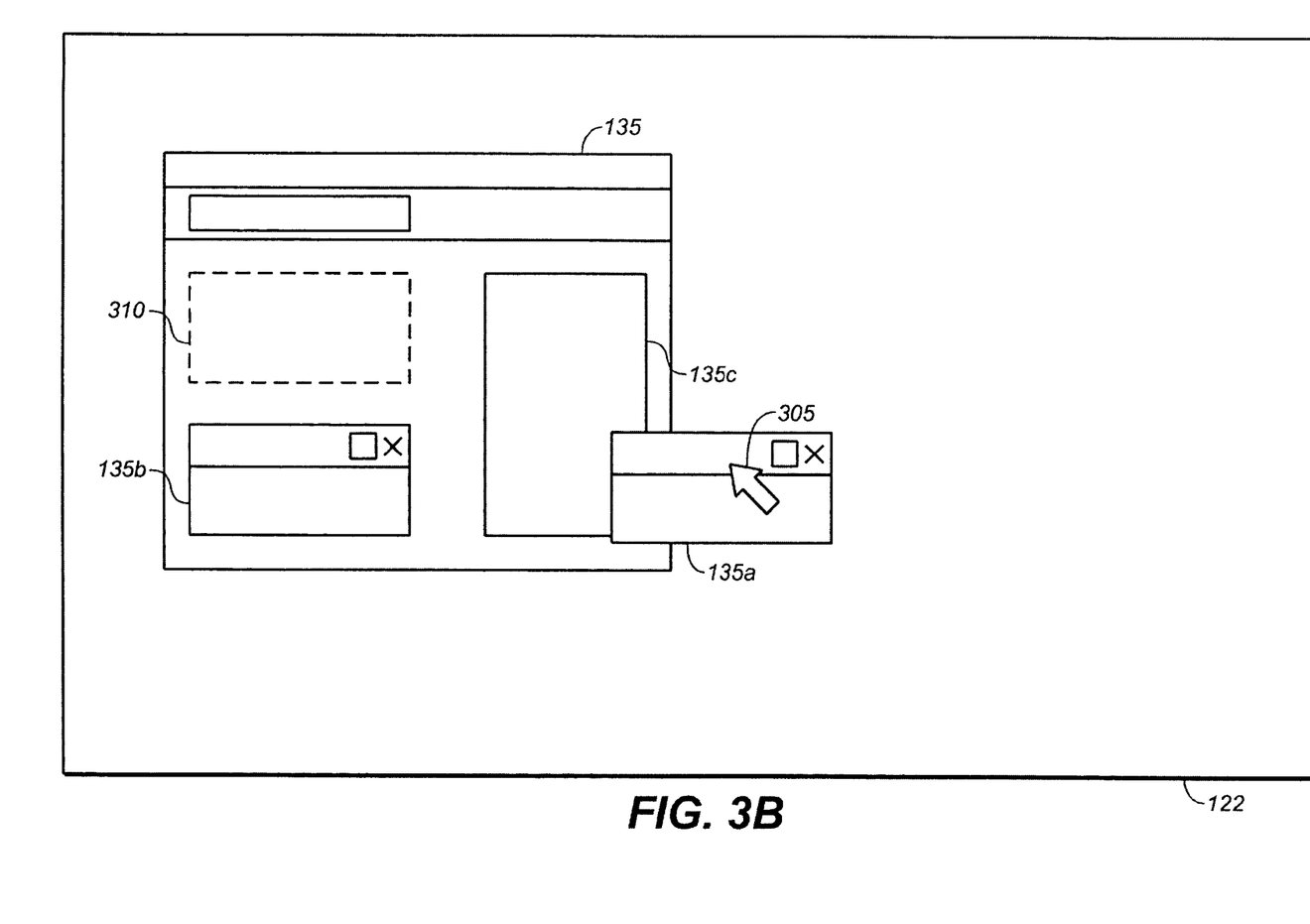

As seen in FIG. 3B, while the component 135a is dragged out of the application window 135, a wire frame 310 can be generated in some implementations to represent the original location of the selected component 135a within the application window 135. Likewise, a wire frame 310 can also be inserted temporarily at valid drop positions to indicate the effect of dropping a selected component 135a there. During the drag-and-drop process, a ghost image depicting the selected component 135a can also be generated and attached to the cursor 305 as the cursor drags the component 135a onto the desktop 122.

Figure 3C:
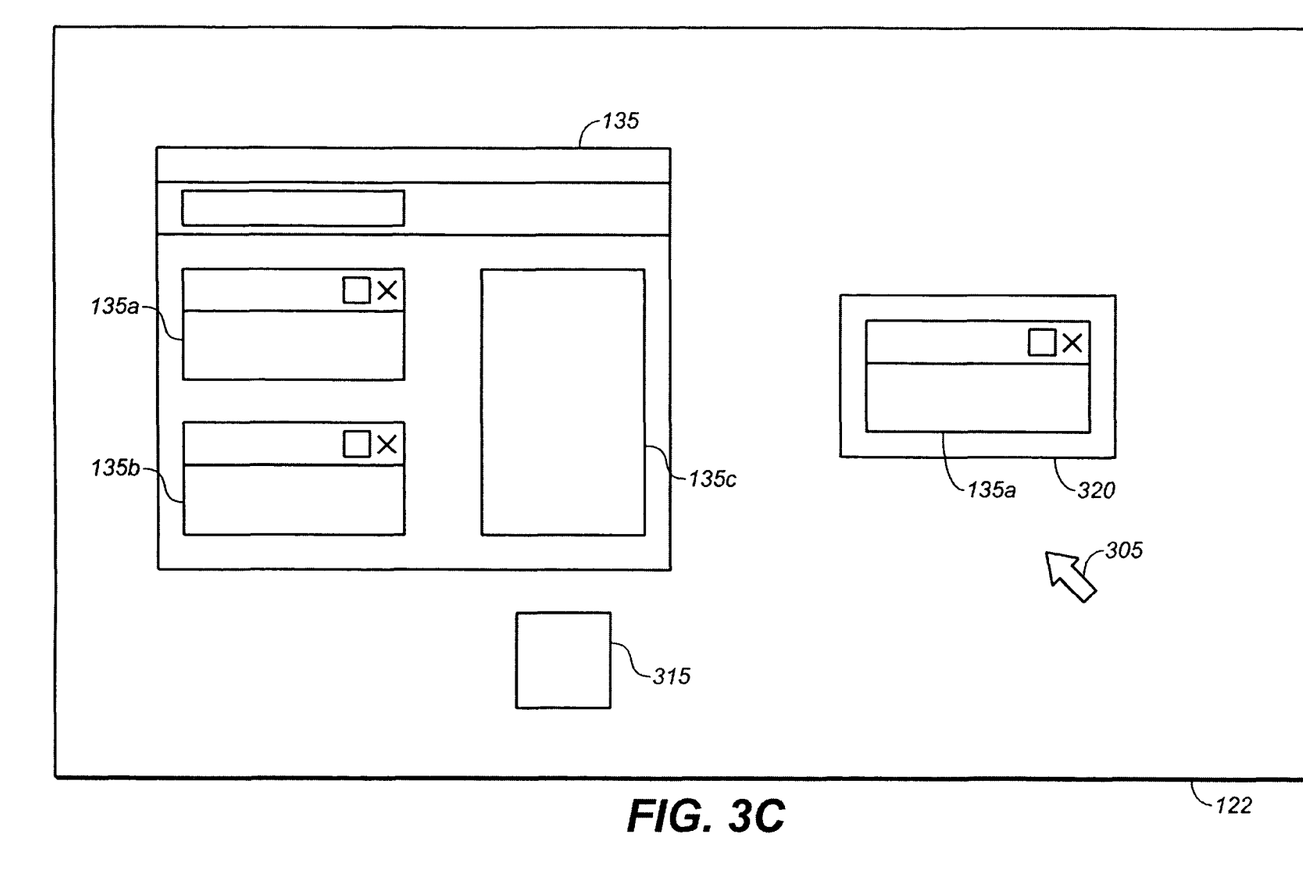

As shown in FIG. 3C, when the user drops the component 135a onto the desktop 122, a new display window 320 is executed for presenting the selected component 135a to the user. In some implementations, a configuration file is generated as the component 135a is dropped onto the desktop 122. As previously described, the configuration file includes parameters for presenting a selected component 135a, including the identification information of the component 135a to be dragged onto the desktop or a URL indicating the location of the component 135a on a server, as well as parameters for filtering any unselected components 135b-c of an application 135. An icon 315 representing the configuration file may also be generated on the desktop 122. The selected component 135a is presented in the display window 320 while the unselected portions of the application 135b-c are hidden from view in the display window 320.

Figure 3D:
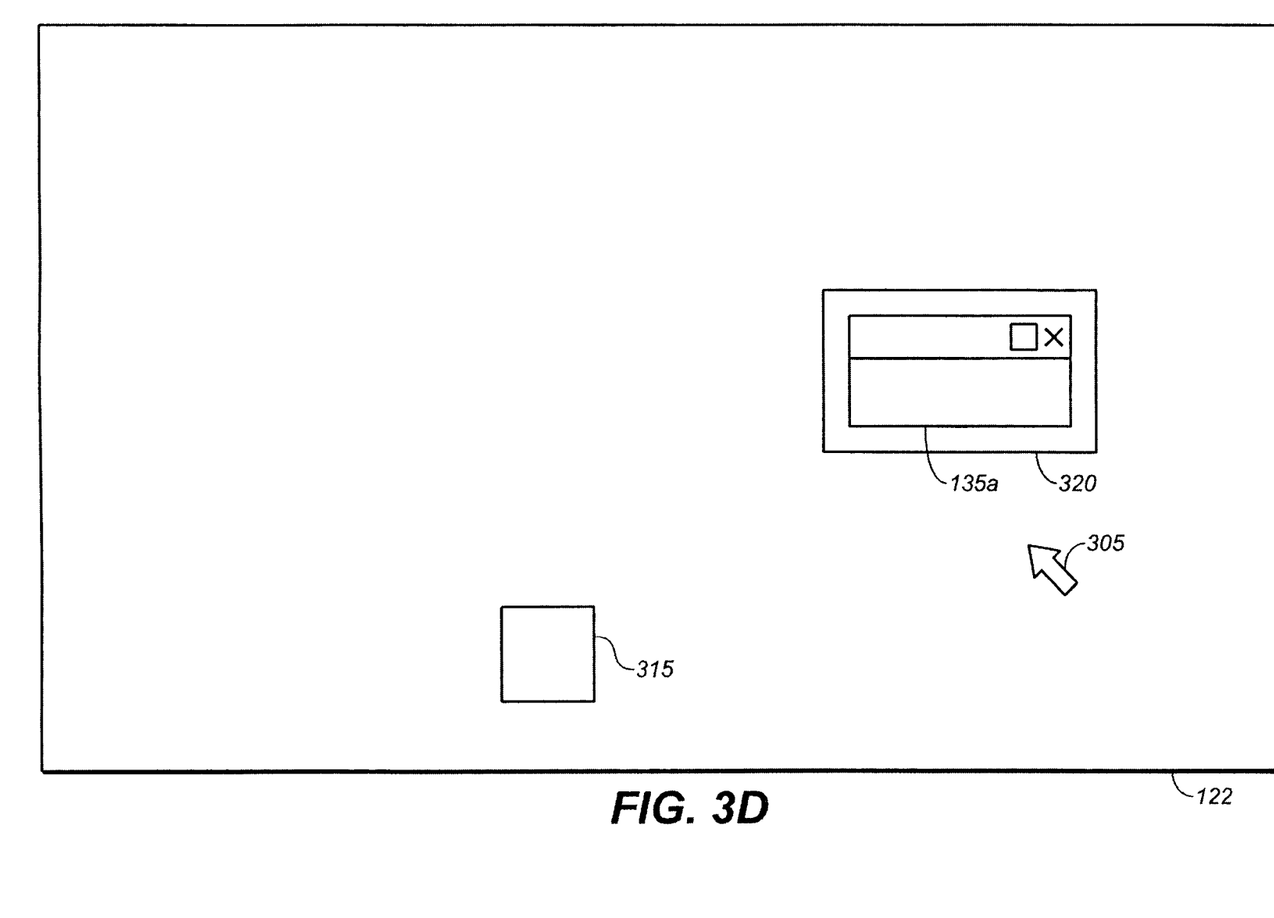

Finally, as depicted in FIG. 3D, the original application window 135 can be closed once the selected component 135a has been copied onto the desktop 122. The component 135a can continue to be updated by the application 135, and the user may interact with the selected component 135a as if using a stand-alone application. In certain implementations, the icon of the configuration file 315 can link to a second display window, and double-clicking the icon 315 can initiate a second instance of the component 135a to be presented in the second display window.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate. For example, while example method 200 discusses the copying of a selected component of the application to the desktop using drag-and-drop operations, such copying need not be limited to drag-and-drop operations and may instead involve copy and paste operations.

In other words, although this disclosure has been described in terms of certain embodiments and generally associated methods, alterations and permutations or these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for causing a processor to drag and drop a component of an application to a virtual desktop, the method comprising the following steps performed by one or more processors:
    displaying a plurality of components of a computer software application in a corresponding plurality of portions in a virtual desktop, wherein each component of the plurality of components is displayed in a respective portion of the plurality of portions, and wherein a particular component has a particular appearance;
    receiving a request to copy the particular component of the plurality of components from a particular portion the virtual desktop in which the particular component is displayed to another portion on the virtual desktop; and
    in response to receiving the request:
        executing a display window for displaying the particular component of the application to a user at the other portion on the virtual desktop;
        filtering a plurality of unselected components of the plurality of components by visually concealing the plurality of unselected components;
        presenting the particular component of the application with the particular appearance in the display window;
        creating a configuration file that includes an identification of a storage location of the particular component; and
        displaying an icon representing the configuration file in the virtual desktop, wherein a selection of the icon represents input to execute the configuration file to present the particular component in a second display window in the virtual desktop.

2. The method of claim 1, wherein presenting the particular component of the application includes executing a drag and drop sequence, the drag and drop sequence providing a visual depiction of the particular component copied from the application to the virtual desktop.

3. The method of claim 1, further comprising creating a configuration file comprising filter parameters defining the filtering of the plurality of unselected components of the application.

4. The method of claim 3, the configuration file further comprising an identification of the location of the particular component of the application.

5. The method of claim 3, wherein execution of the configuration file initiates presentation of the particular component of the application in a second display window.

6. The method of claim 1, wherein the application comprises an application executed on a remote server with respect to the user of the virtual desktop.

7. The method of claim 1, further comprising updating the particular component of the application after presentation in the display window.

8. The method of claim 1, wherein each component of the plurality of components of the application is configured in a framed data structure operable to be filtered based on the user's selection.

9. The method of claim 1, wherein the display window is accessible from the virtual desktop.

10. The method of claim 1, wherein the application is a business application or software development application.

11. The method of claim 1, further comprising:
    detecting the selection of the icon; and
    in response to detecting the selection:
        executing the configuration file, and
        presenting the particular component in a second display window in the virtual desktop.

12. A computer program product encoded on a tangible storage medium, the product comprising computer readable instructions for causing one or more processors to perform operations comprising:
    displaying a plurality of components of a computer software application in a corresponding plurality of portions in a virtual desktop, wherein each component of the plurality of components is displayed in a respective portion of the plurality of portions, and wherein a particular component has a particular appearance;
    receiving a request to copy a particular component of the plurality of components from a particular portion of the virtual desktop in which the particular component is displayed to another portion on the virtual desktop; and
    in response to receiving the request:
        executing a display window for displaying the particular component of the application to a user at the other portion on the virtual desktop;
        filtering a plurality of unselected components of the plurality of components by visually concealing the plurality of unselected components;
        presenting the particular component of the application with the particular appearance in the display window;
        creating a configuration file that includes an identification of a storage location of the particular component; and
        displaying an icon representing the configuration file in the virtual desktop, wherein a selection of the icon represents input to execute the configuration file to present the particular component in a second display window in the virtual desktop.

13. The computer program product of claim 12, wherein presenting the selected particular component of the application includes executing a drag and drop sequence, the drag and drop sequence providing a visual depiction of the particular component copied from the application to the virtual desktop.

14. The computer program product of claim 12, further comprising creating a configuration file comprising filter parameters defining the filtering of the plurality of unselected components of the application.

15. The computer program product of claim 14, the configuration file further comprising an identification of the location of the particular component of the application.

16. The computer program product of claim 14, wherein execution of the configuration file initiates presentation of the particular component of the application in a second display window.

17. The computer program product of claim 12, wherein the application comprises an application executed on a remote server with respect to the user of the virtual desktop.

18. The computer program product of claim 12, further comprising updating the particular component of the application after presentation in the display window.

19. The computer program product of claim 12, wherein each component of the plurality of components of the application is configured in a framed data structure operable to be filtered based on the user's selection.

20. The computer program product of claim 12, wherein the display window is accessible from the virtual desktop.

21. The computer program product of claim 12, wherein the application is a business application or software development application.

22. The computer program product of claim 12, the operations further comprising:
  detecting the selection of the icon; and
  in response to detecting the selection:
    executing the configuration file, and
    presenting the particular component in a second display window in the virtual desktop.

* * * * *